United States Patent
Husemann et al.

(10) Patent No.: US 8,272,038 B2
(45) Date of Patent: Sep. 18, 2012

(54) METHOD AND APPARATUS FOR SECURE AUTHORIZATION

(75) Inventors: Dirk Husemann, Einsiedeln (CH); Micheal Elton Nidd, Zürich (CH)

(73) Assignee: International Business Machines Corporation, Armonk, NY (US)

( * ) Notice: Subject to any disclaimer, the term of this patent is extended or adjusted under 35 U.S.C. 154(b) by 1157 days.

(21) Appl. No.: 12/123,009

(22) Filed: May 19, 2008

(65) Prior Publication Data

US 2009/0288159 A1 Nov. 19, 2009

(51) Int. Cl.
*H04L 9/32* (2006.01)
(52) U.S. Cl. ......... 726/3; 726/2; 726/6; 726/16; 726/17; 726/21; 713/155; 713/185
(58) Field of Classification Search .................. 713/155, 713/184–185; 726/2–7, 16–21
See application file for complete search history.

(56) References Cited

U.S. PATENT DOCUMENTS

| | | | |
|---|---|---|---|
| 4,939,354 A | 7/1990 | Priddy et al. | |
| 5,591,956 A | 1/1997 | Longacre, Jr. et al. | |
| 5,726,435 A | 3/1998 | Hara et al. | |
| 2003/0177366 A1* | 9/2003 | de Jong | 713/184 |
| 2004/0148253 A1* | 7/2004 | Shin et al. | 705/39 |
| 2005/0059393 A1* | 3/2005 | Knowles | 455/432.3 |
| 2006/0135064 A1* | 6/2006 | Cho et al. | 455/41.1 |
| 2007/0256118 A1* | 11/2007 | Nomura et al. | 726/3 |
| 2007/0300220 A1* | 12/2007 | Seliger et al. | 718/1 |
| 2010/0275010 A1* | 10/2010 | Ghirardi | 713/155 |

OTHER PUBLICATIONS

Gao, J.Z. Prakash, L. ; Jagatesan, R. , Commerce—Design and Implementation of a 2D Barcode Processing Solution, COMPSAC 2007. 31st Annual International, Volume: 2 , pp. 49-56.*

* cited by examiner

*Primary Examiner* — Taghi Arani
*Assistant Examiner* — Amir Mehrmanesh
(74) *Attorney, Agent, or Firm* — Daniel P. Morris; Ryan, Mason & Lewis, LLP

(57) ABSTRACT

A method for authorizing access to a first computing device is provided. The method comprises the first computing device forming a challenge, encoding the challenge into a symbol, and displaying the symbol. The first computing device receives a request for access from a user. Access to the first computing device is allowed in response to provision of an access code to the first computing device by the user. The access code is formed by a server in response to capturing the symbol, decoding the symbol into the challenge, forming a request from the challenge, and providing the request to the server. The server forms a decision to allow access by the user to the first computing device.

22 Claims, 6 Drawing Sheets

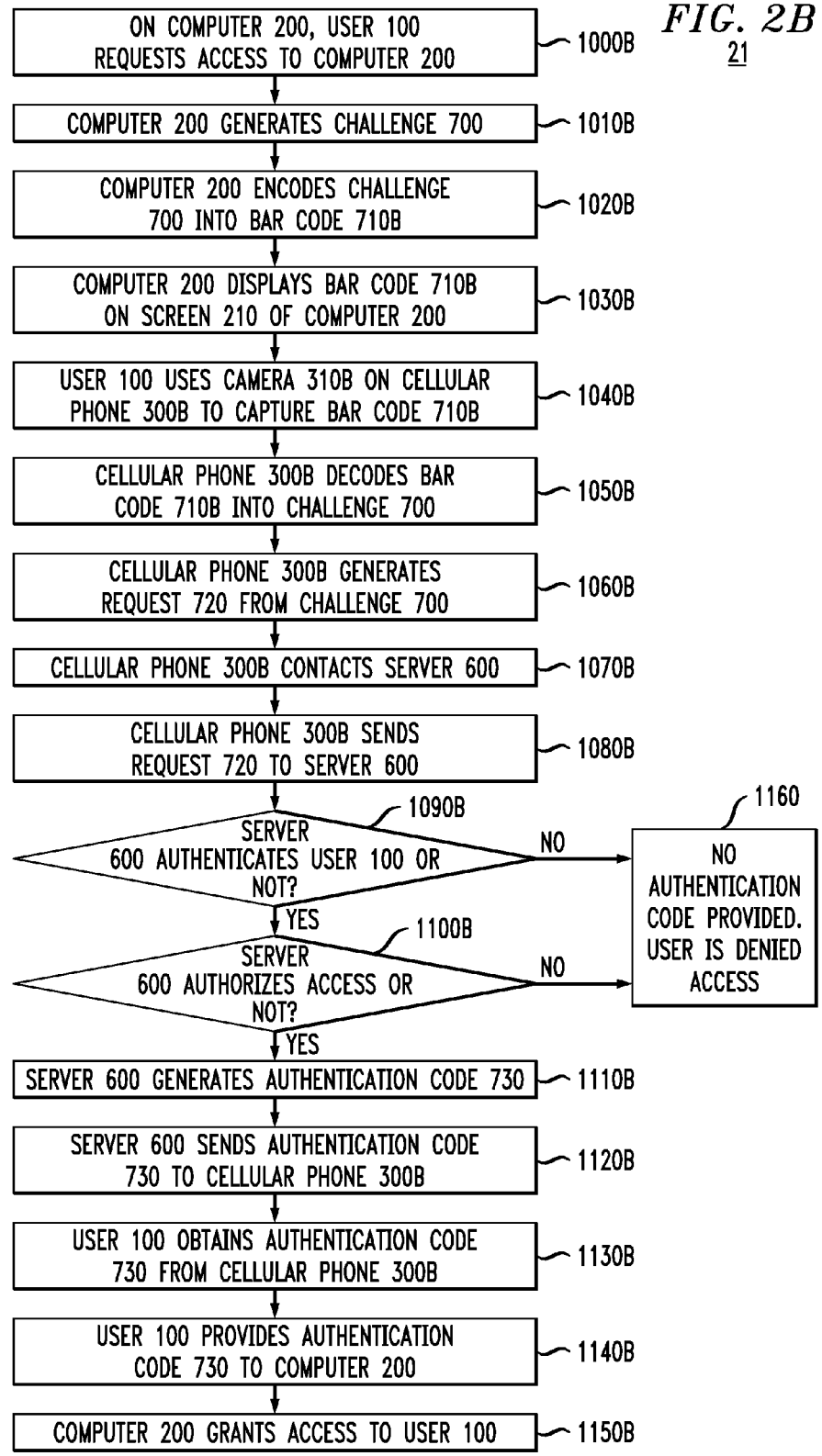

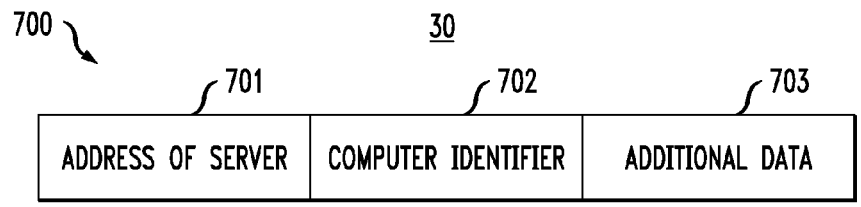
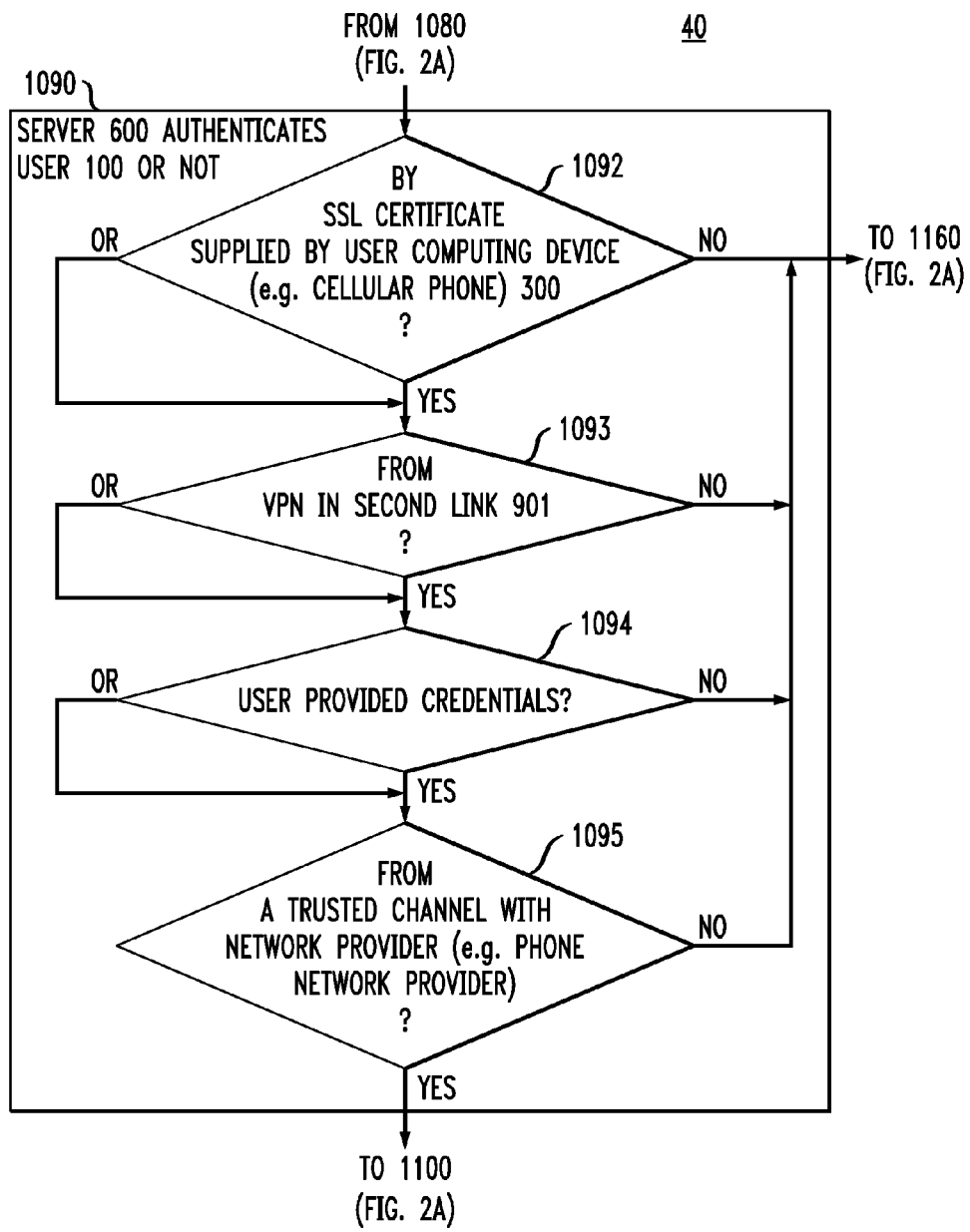

60

METHOD AND APPARATUS FOR SECURE AUTHORIZATION

FIELD OF THE INVENTION

The present invention relates generally to computer security, and more particularly the invention relates to providing secure methods and apparatus for remote authorization of access to a computing device.

BACKGROUND OF THE INVENTION

Often in the technical service industry, a service technician will need to gain access to a computer of a customer. Often the computer is not connected to a network capable of allowing the technician to access to the computer. It may not even be connected to any network. Examples of solutions are to have the customer supply his or her access credentials such as user identification (ID) and password to the technician and allow the customer to have administrative privileges, have a database of access credentials available to the technician, and have a common administrator password known by the technician.

In many cases, none of these solutions provide adequate security. It may not be consistent with security policies to allow the customer to have administrative privileges giving them the ability to reconfigure their computers. A database with computer credentials may not be secure and may allow an individual access to many more computer systems than intended. A common administrator password may also not be secure but become known by non-authorized persons or grant access to more computers than intended.

SUMMARY OF THE INVENTION

Principles of the invention provide secure methods and apparatus for remote authorization of access to a computing device.

For example, in one embodiment a method for authorizing access to a first computing device is provided. The method comprises the first computing device forming a challenge, encoding the challenge into a symbol, and displaying the symbol. The first computing device receives a request for access from a user. Access to the first computing device is allowed in response to provision of an access code to the first computing device by the user. The access code is formed by a server in response to capturing the symbol, decoding the symbol into the challenge, forming a request from the challenge, and providing the request to the server. The server forms a decision to allow access by the user to the first computing device.

A communications network for authorizing access to a first computing device is also provided, the network comprises the first computing device that a user is requesting access to, a second computing device, a server, a first communications link that couples the second computing device and the server, and a second communications link that couples the first computing device and the second computing device. The communications network uses a method for authorizing access to the first computing device. The method comprises a user requesting an access to the first computing device, the first computing device generating a challenge and encoding the challenge into a symbol, the user capturing the symbol within the second computing device, the second computing device decoding the symbol into the challenge, generating a request from the challenge, and providing the request to the server. The server forms a decision to allow or to disallow the user access to the first computing device. The server forms an access code and provides the access code to the second computing device. The user provides the access code to the first computing device.

Advantages of the present invention allow, for example, secure access of service technicians to customer computers. The invention does not require costly hardware to be installed but can be deployed as a software installation. The invention does not require the computer of a customer to be connected to a network.

These and other features, objects and advantages of the present invention will become apparent from the following detailed description of illustrative embodiments thereof, which is to be read in connection with the accompanying drawings.

BRIEF DESCRIPTION OF THE DRAWINGS

FIG. 2B is a flow diagram of a method for secure authorization according to another exemplary embodiment of the invention.

FIG. 3 illustrates exemplary components of a challenge according to an embodiment of the invention.

FIG. 4 illustrates the details of step 1090 of FIG. 2, "server authenticates user, or not."

DETAILED DESCRIPTION OF THE INVENTION

Figure 1:
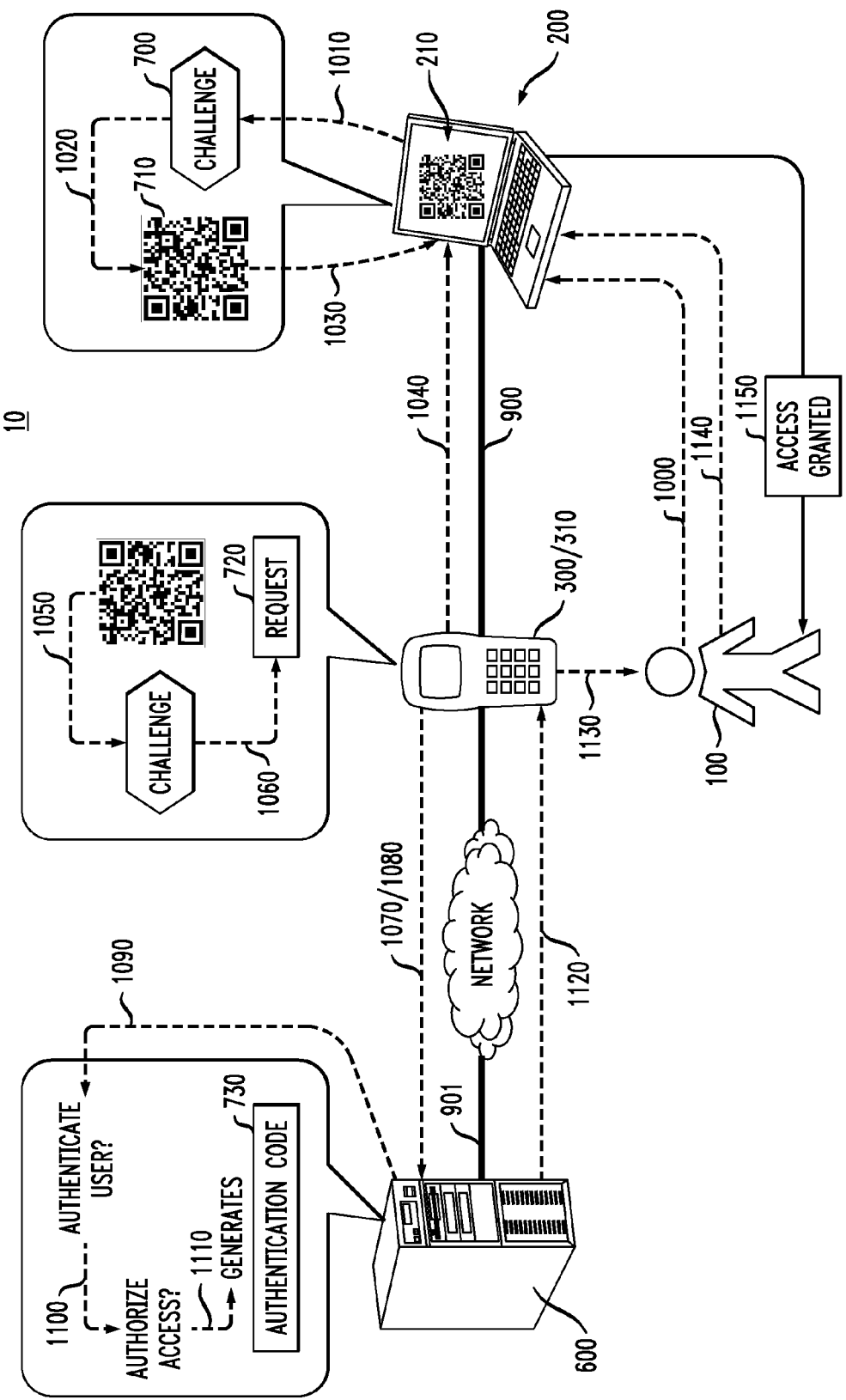
FIG. 1 shows a method and a network for secure authorization according to an exemplary embodiment of the invention

FIG. 1 illustrates a communications network and method for obtaining secure authorization of a remote computer according to exemplary aspects of the invention. Computer 200 is a network node, although, in this embodiment, computer 200 is not connected to the network by a typical hard-wired, optical-fiber on telemetric high-speed data link. Rather, the connection of computer 200 to the network is by a link intended to convey relatively small amounts of data necessary for the secure authorization described herein. An example is a visual link between a camera and a display screen. A service technician, herein referred to as user 100, requires and is requesting access to computer 200. The user 100 typically needs access to computer 200 in order to order to perform hardware and/or software initialization or some other task on computer 200. Another network node is the user computing device 300. The user computing device 300 is under control of the user 100 and considered an extension of the user 100 in that the identity of the user 100 can be established by identifying the user computing device 300. A third network node is server 600. The server 600 is the "authorizing agent", that is, the server 600 will decide if access is to be granted and if so, it will generate and deliver the authentication code to the user 100. The authentication code is also called the access code.

Exemplary network communications links shown in FIG. 1 are the first link 900 between the user computing device 300 and the computer 200, and the second link 901 between the user computing device 300 and the server 600. The first link 900 is preferably a short visual link, not a wire or optical-fiber link. Alternately, it could be a short auditory or infrared link. As indicated in FIG. 1, the second link 901 may be through a network, such as a cellular phone network. Alternately or in addition, the second link 901 may be through the internet, an intranet, a virtual private network (VPN), a trusted channel or other communications channel. The second link 901 may optionally include a gateway, for example, a VPN gateway. The second link 901 may be adapted to use various communication protocols including, but not limited to, short message service (SMS), multimedia message service (MMS), transport layer security (TLS), secure sockets layer (SSL), file transfer protocol (FTP), hypertext transfer protocol (HTTP), point-to-point protocol (PPP), various cellular phone network protocols, and VPN related protocols. The first link 900 is preferably a visual communications link. However it is not so limited and may be, for example, infrared, auditory or electrical.

Figure 2A:
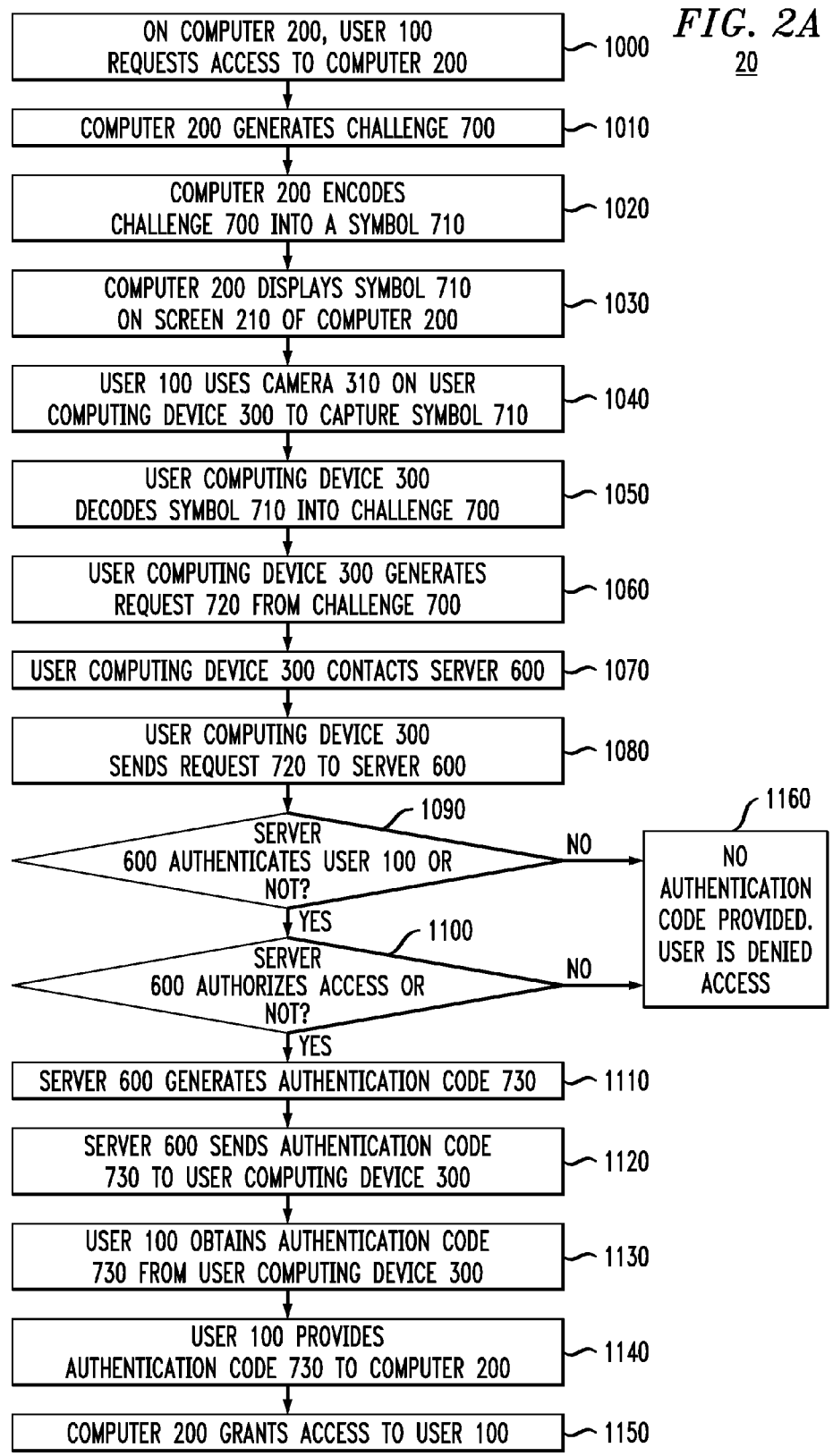
FIG. 2A is a flow diagram of a method for secure authorization according to an exemplary embodiment of the invention.

FIG. 2A is, a flow diagram 20 of a method for obtaining secure access to computer 200 according to an exemplary embodiment of the invention. Steps of the method flow are also indicated by the labeled dash lines in FIG. 1.

In the first step 1000 of the method 20 using computer 200, user 100 requests access to computer 200. The user is not the owner or customary user of the computer 200, so he does not have customary user access credentials such as a user ID and password for computer 200.

In response to the request 1000, the computer 200 generates a challenge 700 (step 1010) and encodes the challenge 700 into a symbol 710 (step 1020). As shown in FIG. 3, the challenge 700 typically comprises the address of the server 701 and the identity of the computer 200 (computer identifier 702). The address of the server 701 may comprise a uniform resource locator (URL). The first part of the URL is typically a protocol identifier indicating what communications protocol to use. Examples of protocol identifiers are ftp and http. The second part is typically a resource name specifying the internet protocol (IP) address or the domain name where the resource is located. The resource in this case is the server 600. The protocol identifier and the resource name are typically separated by a colon and two forward slashes. Optionally, challenge 700 may further comprise additional data 703.

After encoding 1020, the symbol 710 is visually displayed on the display screen 210 of computer 200 (step 1030). In step 1040, the user captures the symbol 710 by taking a picture of the symbol 710 displayed on computer screen 210 with a camera 310 integral or attached to user computing device 300. The user computing device 300 now has the symbol 710 captured. In step 1050, the user computing device 300 decodes the symbol 710 back into the original challenge 700. In this way, the user computing device 300 has the server address 701 and the computer identifier 702. If included in the challenge 700, the user computing device 300 also has additional data 703. The user computing device 300 generates a request 720 from information within the challenge 700 (step 1060). Request 720 typically comprises the computer identifier 702 and, if in the challenge 700, additional data 703. Using the server address 701 obtained from the challenge 700, user computing device 300 contacts server 600 (step 1070). The user computing device 300 sends the request 720 to the server 600 for processing (step 1080).

The server 600 then authenticates the user 100 (step 1090). Authenticating the user 100 is to establish the identity of the user 100. In one embodiment, the user 100 is directly authenticated. In another embodiment, the user 100 is indirectly authenticated by authenticating the user computing device 300. FIG. 4 shows four ways to authenticate the user (100). One way to obtain the identity of the user 100 is by establishing the identity of the user computing device 300. The user computing device 300 identity is obtained using the secure sockets layer protocol or the transport layer security protocol. For a user computing device, the client authentication SSL certificate is supplied to the server 600 by the user computing device 300 (step 1092 of FIG. 4). This establishes the identity of the user computing device 300 and by inference the user 100. A second way to obtain the identity of the user 100 is to obtain the identity of the user computing device 300 from a VPN gateway that may be part of the second link 901 (step 1093 of FIG. 4). A third way to obtain the identity of the user 100 is by credentials supplied by the user 100 through the user computing device 300 to the server 600 (step 1094 of FIG. 4). In one embodiment, the server 600 will provide a form to the user computing device 300, the form comprising a web page. The form will ask for user credentials. User credentials are, for example, user identification code (user ID), user password and answers to one or more questions asked on the form. Correct answers to the requested credentials will establish the identity of the user 100. A fourth way to establish the identity of the user 100 is to obtain the identity of the user computing device 300 via a trusted channel associated with or within the second link 901 (step 1095 of FIG. 4). An example of this is to obtain the identity of the cellular phone of the user via a trusted channel with the phone network provider.

In some embodiments of the invention, only one of the above four methods of user authentication will be used. Other embodiments may use more than one of the above four methods. If the user 100 is authenticated, that is, if his identity is established according to the method provided, step 1090 of FIG. 2 is complete and the method for obtaining secure access to computer 200 will continue with step 1100. If the user 100 has not been authenticated, that is, if his identity has not been established according to the method provided, no authentication code is provided by the server 600 to the user 100, denying access to computer 200 (step 1160).

Figure 5:
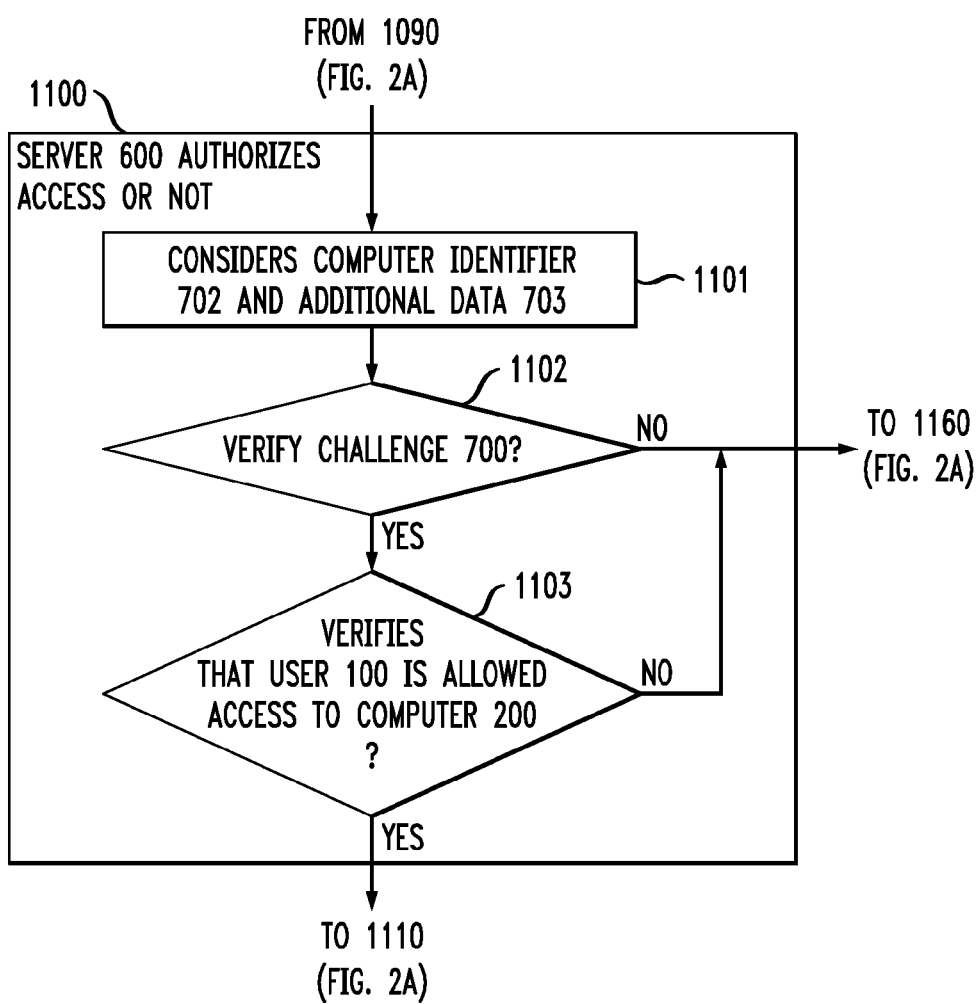
FIG. 5 illustrates the details of step 1100 of FIG. 2, "server authorizes access or not."

Step 1100 is to authorize or not authorize access by the user 100 to computer 200. In step 1080, the server 600 has received from the user computing device 300 the computer identifier 702 and optionally additional data 703. FIG. 5 details the step 1100 of FIG. 2. Server 600 forms a decision to allow or disallow access based upon predetermined criteria that include consideration of, for example, the computer identifier 702 and, optionally, additional data 703 (step 1101 of FIG. 5). Server 600 then attempts to verify the challenge (step 1102 of FIG. 5). In this example, server 600 verifies the challenge by examining a database to determine if computer 200 is listed in the database. If it is, the challenge is verified, or partially verified if there is additional data 703. If there is additional data 703, server 600 completes verification by determining if criteria involving additional data 703 are met.

Finally, in forming a decision to allow or disallow access, if the challenge has been verified, server 600 will examine a database listing computers and users. This database lists computers and users indicating which users should be allowed access to which computers. Server 600 will allow access if the database shows that user 100 should be allowed access to computer 200. If access is disallowed, no authentication code is provided by the server 600 to the user 100, denying user 100 access to computer 200 (step 1160).

If the decision is to allow access, the server 600 generates authentication code 730 (step 1110 of FIG. 2). The server 600 sends the authentication code 730 to the user computing device 300 (step 1120). Typically the authentication code 730 is sent to the user computing device 300 over the second link 901. The user 100 obtains the authentication code 730 from the user computing device 300 (step 1130) and provides the authentication code 730 to the computer 200 (step 1140). Accepting the authentication code 730, computer 200 grants access to user 100 (step 1150).

Figure 6:
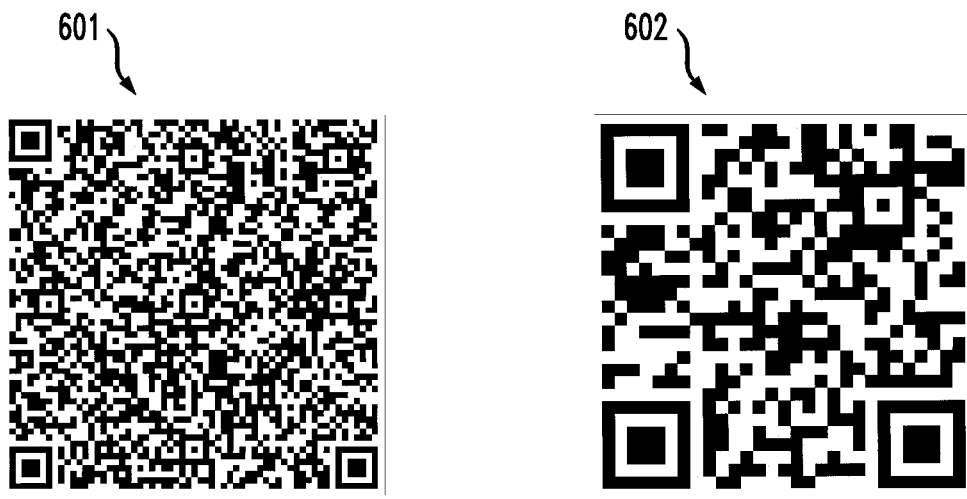
FIG. 6 illustrates two exemplary quick response (QR) two-dimensional bar codes.

FIG. 2B shows the method of FIG. 2A with exemplary devices at some network nodes. An exemplary user computing device 300 is a cellular phone 300B. The cellular phone 300B has an integral camera 310B. The second link 901 is within a cellular network. Other useful user computing devices 300 include, but are not limited to, a personal digital assistant, a palmtop computer, and a personal computer, a laptop computer and a wireless internet access device. In the embodiment shown in FIG. 2B, the challenge 700 is encoded into a bar code 710B, for example, a two-dimensional (2D) bar code such as a datamatrix or quick response (QR) 2D matrix bar code. Other visual encoded symbols could be used instead of a 2D bar code, for example but not limited to, a linear bar code. 2D bar codes can encapsulate URLs, text messages, emails, and general text. FIG. 6 shows a QR code 601 encapsulating a sentence of text. FIG. 6 also shows a QR code 602 encapsulating a URL. Although not shown in FIG. 2B, the computing device may be, for example, a personal computer, a laptop computer, a server computer, a palmtop computer, a personal digital assistant or a desktop computer.

In some embodiments of the invention, it may be desirable to differentiate challenges formed at different times. An exemplary purpose is to allow a challenge 700 and corresponding request 720 to be used only once, or only during a limited time period. To do this, the server 600 needs to be able to differentiate requests 720 sent by the same user 100 for access to the same computer 200. Consequently, the request 720 must contain more than just the identity of the computer 702. The request 720 will contain additional data 703 comprising a nonce. A nonce stands for number used once. In one embodiment the nonce is a timestamp. In another embodiment the nonce is a random or pseudo-random number. The nonce is different each time that the challenge is generated. To ensure that a nonce is used only once, it should be time-variant, or generated with enough random bits to ensure a probabilistically insignificant chance of repeating a previously generated nonce.

In an alternate embodiment the challenge 700 may comprise a text message and destination phone number which, after encoding, capture and decoding into the request 720, will be sent by the user computing device 300, which is preferably the cellular phone 300B, to a receiving device coupled to the server. The text message is sent, for example, using SMS or MMS protocols. The test message preferably contains the computer identity and, optionally, additional data. Identity is authenticated by the server 600 checking the phone number of the cellular phone 300B against a list of registered phone numbers. The authentication code is then returned to the user computing device 300 or cellular phone 300B in the form of a text message preferably again using SMS or MMS protocols.

In another embodiment, computer 200 has a webcam attached. In step 1120 of FIG. 2, the server 600 sends the authentication code to the user computing device 300 in the form of a symbol, such as, but not limited to, another 2D barcode. The user computing device 300 displays the symbol to the webcam for capture by computer 200. The user computing device may be a cellular phone with a screen for display, a computer with display or other device capable of receiving and displaying the symbol.

In another embodiment, the steps 1120 and 1130 of FIG. 2 (the server 600 sending the authentication code 730 and the user 100 obtaining the authentication code 730) may comprise communications between the server 600 and the user 100 through an outside channel, for example, by a voice call to a cellular phone or a land-line phone located in a specific place, preferably in the vicinity of the computer 200.

In another embodiment, the challenge 700 and the encoded symbol 710 would not include the address of the server 701. In this embodiment, a dedicated software application run on the user computing device 300 supplies the address of the server.

In yet another embodiment, symbol 710 is a non-visual symbol. It is therefore not captured by a camera coupled to the user computing device 300, but by a non-visual sensor. For example, the symbol may be auditory and captured by a microphone, or it may be infrared and captured by an infrared sensor. In this case the second link 900 is not visual but auditory or infrared.

Figure 7:
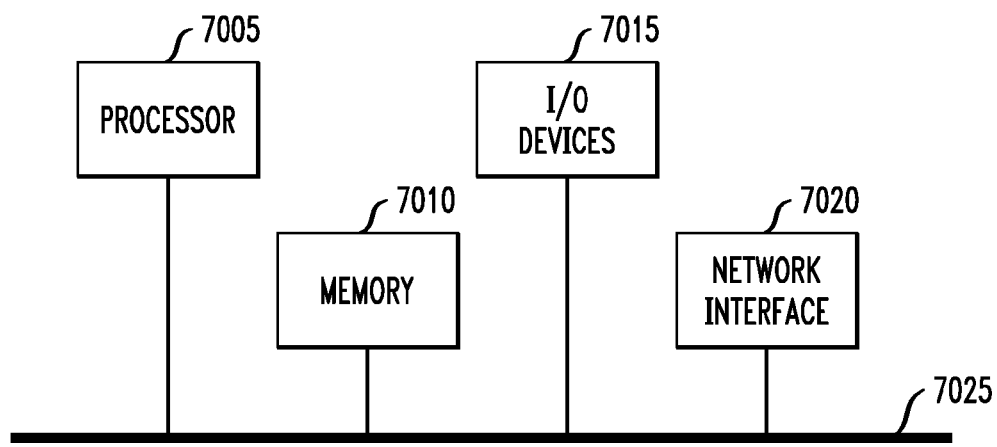
FIG. 7 illustrates a computer system in accordance with which one or more components/steps of the techniques of the invention may be implemented, according to an embodiment of the invention.

Lastly, FIG. 7 illustrates a computer system in accordance with which one or more components/steps (e.g., components/steps depicted in FIGS. 1-6) of the techniques of the invention may be implemented. It is to be further understood that the individual components/steps may be implemented on one such computer system or on more than one such computer system. In the case of an implementation on a distributed computing system, the individual computer systems and/or devices may be connected via a suitable network, e.g., cellular phone network, the Internet or World Wide Web. However, the system may be realized via private or local networks. In any case, the invention is not limited to any particular network.

Thus, the computer system shown in FIG. 7 may represent one or more servers, mobile or stationary computing devices, or one or more other processing devices capable of providing all or portions of the functions described herein. Alternatively, FIG. 7 may represent a cellular phone, a personal digital assistant, a palmtop computer, a personal computer, a laptop computer, or a wireless internet access device. That is, the computer system shown in FIG. 7 could, for example, be one or more of the user computing device 300, server 600, computing device 200, the first link 900, and the second link 901.

The computer system may generally include a processor 7005, memory 7010, input/output (I/O) devices 7015, and network interface 7020, coupled via a computer bus 7025 or alternate connection arrangement, for example, first link 900 and second link 901. An example of input/output device 7015 is camera 310.

It is to be appreciated that the term "processor" as used herein is intended to include any processing device, such as, for example, one that includes a central processing unit (CPU) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, random access memory (RAM), read only memory (ROM), a fixed memory device (e.g., hard disk drive), a removable memory device (e.g., diskette, compact disk, digital video disk or flash memory module), flash memory, non-volatile memory, etc. The memory may be considered a computer readable storage medium.

In addition, the phrase "input/output devices" or "I/O devices" as used herein is intended to include, for example, one or more input devices (e.g., keyboard, mouse, camera, etc.) for entering data to the processing unit, and/or one or more output devices (e.g., display, etc.) for presenting results associated with the processing unit.

Still further, the phrase "network interface" as used herein is intended to include, for example, one or more transceivers to permit the computer system to communicate with another computer system via an appropriate communications protocol.

Accordingly, software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A method for authorizing access to a first computing device, the method comprising:
   the first computing device receiving a request from a user to access the first computing device;
   the first computing device forming a challenge, said challenge comprising an identifier of the first computing device;
   the first computing device encoding the challenge into a symbol;
   the first computing device displaying the symbol,
   the first computing device allowing the user access to the first computing device in response to an access code that is generated by a server and provided by the user to the first computing device,
   wherein the access code is formed by a server in response to the user initiating a process of capturing the symbol, decoding the symbol into the challenge, forming a request from the challenge, and providing the request to the server, and wherein the server forms a decision to allow access by the user to the first computing device.

2. The method of claim 1, wherein a second computing device of the user performs the steps of the capturing and the decoding of the symbol and the forming and the providing of the request, wherein the server provides the access code to the second computing device of the user.

3. The method of claim 1, wherein the first computing device is at least one of a personal computer, a laptop computer, a palmtop computer, a desktop computer, a server computer and a personal digital assistant.

4. The method of claim 2, wherein the second computing device comprises at least one of a cellular phone, a personal digital assistant, a palmtop computer, a personal computer, a laptop computer, a wireless Internet access device, and a camera.

5. The method of claim 1, wherein the challenge further comprises a server address.

6. The method of claim 1, wherein the challenge comprises a function, wherein the function differentiates challenges formed at different times.

7. The method of claim 6, wherein the function is a nonce.

8. The method of claim 5, wherein the server address comprises at least one of a uniform resource locator, an address formed to facilitate short message service protocol communication, an address formed to facilitate multimedia messaging service protocol communications, and an address formed to facilitate text messaging communications.

9. The method of claim 1, wherein the symbol comprises at least one of a bar code, a two dimensional bar code, a linear bar code, a datamatrix code, a QR code, a visual signal, an auditory signal, and an infrared signal.

10. The method of claim 2, wherein the capturing of the symbol is within the second computing device using at least one of a camera, a microphone and an infrared sensor.

11. The method of claim 2, wherein the request comprises the first computing device identifier.

12. The method of claim 6, wherein the request comprises the function.

13. The method of claim 2, further comprising authenticating an identity of the second computing device, wherein the identity of the second computing device is obtained using a protocol comprising at least one of secure sockets layer protocol and transport layer security protocol.

14. The method of claim 2, further comprising authenticating an identity of the second computing device, wherein the identity is obtained from a virtual private network gateway.

15. The method of claim 2, further comprising authenticating an identity of the user, wherein the identity is obtained from a credential sent by the second computing device to the server, wherein the credential comprise at least one of a user identification code, a user password, and a user answer to a question formed by the server.

16. The method of claim 2, further comprising authenticating an identity of the second computing device, wherein the identity of the second computing device is obtained from a network provider through a trusted channel.

17. The method of claim 2, wherein forming the decision comprises consideration of information within the request, and authenticating an identity of at least one of the user and the second computing device.

18. The method of claim 1, wherein a server provides the access code to the user through an outside channel, and wherein the outside channel is a voice call to a phone.

19. The method of claim 1, wherein the access code can be used only once.

20. The method of claim 2, wherein the user provides the access code to the first computing device using a camera coupled to the first computing device to capture an image displayed by the second computing device.

21. A communications network for authorizing access to a first computing device, the network comprising:
   a first computing device, wherein a user is requesting access to the first computing device;
   a second computing device;
   a server;
   a first communications link, wherein the first communications link couples the second computing device and the server; and
   a second communications link, wherein the second communications link couples the first computing device and the second computing device;

wherein a method for authorizing access to the first computing device comprises a user requesting an access to the first computing device, the first computing device generating a challenge, said challenge comprising an identifier of the first computing device, the first computing device encoding the challenge into a symbol, the first computing device displaying the symbol, the user capturing the symbol within the second computing device, the second computing device decoding the symbol into the challenge, the second computing device generating a request from the challenge, the second computing device providing the request to the server, the server forming a decision, wherein one decision is to allow the user access to the first computing device, and wherein an alternate decision is to disallow access to the first computing device by the user, the server forming an access code, the server providing the access code to the second computing device, and the user providing the access code to the first computing device.

22. An article of manufacture for authorizing access to a first computing device, wherein the article comprises a non-transitory computer readable storage medium having one or more programs embodied therewith, wherein the one or more programs, when executed by a computer, perform steps of:

the first computing device receiving a request from a user to access the first computing device;

the first computing device forming a challenge, said challenge comprising an identifier of the first computing device;

the first computing device encoding the challenge into a symbol;

the first computing device displaying the symbol, the first computing device allowing the user access to the first computing device in response to an access code that is generated by a server and provided by the user to the first computing device, wherein the access code is formed by a server in response to the user initiating a process of capturing the symbol, decoding the symbol into the challenge, forming a request from the challenge, and providing the request to the server, and wherein the server forms a decision to allow access by the user to the first computing device.

* * * * *